United States Patent Office

3,565,888
Patented Feb. 23, 1971

3,565,888
BENZODIAZOCINE DERIVATIVES
Cesario O. Tio, King of Prussia, Pa., assignor to American Home Products Corporation, New York, N.Y., a corporation of New York
No Drawing. Filed Mar. 12, 1968, Ser. No. 712,360
Int. Cl. C07d 53/00
U.S. Cl. 260—239    3 Claims

ABSTRACT OF THE DISCLOSURE

A procedure is disclosed in which a 1,2,3,4,5,6-hexahydro-2,5-benzodiazocine is preferentially acylated in the 5-position using ethyl chloroformate to form a 5-carboxylic acid ester. The compounds are useful for preparing pharmacologically useful benzodiazocine derivatives.

---

This invention relates to the preparation of new and useful benzodiazocine carboxylic acid esters.

The compounds of the invention are benzodiazocine esters having the structural formula:

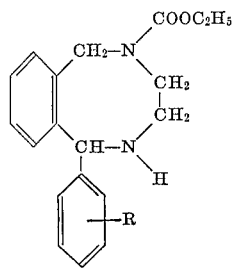

in which R represents either hydrogen; a halogen, preferably chlorine or fluorine; halo(lower)alkyl, preferably trifluoromethyl; or lower alkoxy, preferably methoxy.

By the term "(lower) alkyl" or "lower alkoxy" is meant a radical having 1 to 2 carbon atoms.

The compounds are prepared by reacting an N,N-unsubstituted benzodiazocine with ethyl chloroformate in the temperature range of about 0° to 25° C., using a mild base as an acid acceptor.

The starting benzodiazocine compounds are known and specifically described in various patents and publications, for example, in Belgian Pat. No. 646,221, dated Apr. 7, 1964 which also teaches the method of preparation.

The compounds of the invention are useful as intermediates for the preparation of the corresponding N-methyl benzodiazocines. For this purpose, the esters may be reduced with lithium aluminum hydride using tetrahydrofuran as a solvent and operating under refluxing conditions, thus producing the corresponding 1,2,3,4,5,6-hexahydro-5-methyl-2,5-benzodiazocines which are active as anorectic agents.

In addition to the aforesaid utility, the compounds of the invention are useful in experimental pharmacology, having been found pharmacologically active as CNS antidepressants and also as anorectic agents. The anti-depressant activity was found by submitting the test compound to a standard procedure, e.g., as disclosed in Rubin et al., J. of Pharm. and Exper. Ter., 120: 125 (1957). The test animal is the mouse and the activity was demonstrated at the $ED_{50}$ range of 6 to 15 mg./kg. of body weight in a single oral dose.

In another test procedure, to determine anorectic action, the following method may be used in lieu of any other known procedure for determining utility in this area.

Charles River rats (120–140 g.) are trained to drink sweetened condensed milk from a graduated drinking tube. After this, the animals are placed on a routine of water ad lib for 24 hours, standard laboratory show for 22 hours and sweetened condensed milk for 2 hours. The volume of milk consumed is measured at 30 minutes and at 2 hours, and the animals are weighed daily. This schedule is maintained 5 days a week over a period of several months. The test compound is administered orally in water or intraperitoneally in saline at a specific day and changes in milk consumed and 24 hour weight changes are compared to the average of the two days before compound administration. Animals are tested in groups of six and one group is given saline each week to serve as controls. The drug is administered at the start at about 5 mg./kg. and advancing in increments of 5 or 10 mg./kg. of body weight.

The compounds falling within the scope of this invention were found to be useful as oral anorectic agents at a dose of 10 mg./kg. of body weight.

As previously indicated, the compounds may be administered orally or parenterally. The usual carriers or excipients may be used with the acting drug. Thus, if an oral product is considered the compound may be combined with lactose, talc or kaolin, for example. The compound may also be administered in a liquid vehicle, preferably aqueous.

It may be pointed out that the compounds are prepared by the above described method as the hydrochloride acid-addition salt. However, one may use the compounds either in the form of the free base or in the form of any other non-toxic acid addition salt. The free base may be formed by merely reacting the hydrochloride salt with a base in known manner, for example, using sodium hydroxide. If an acid-addition salt other than the hydrochloride is desired, one may then react the free base as formed with a pharmacologically acceptable mineral acid, for example, sulfuric, phosphoric or hydrobromic acid or an organic acid such as acetic, tartaric, succinic, maleic or other comparable acid in which the acid-addition salt formed would be essentially non-toxic under the conditions of use.

The following example illustrates in detail a typical procedure for preparing compounds falling within the scope of the invention.

EXAMPLE

Add dropwise to a stirred solution of 1.6 grams of 1-(p-chlorophenyl-1,2,3,4,5,6 - hexahydro-2,5-benzodiazocine and 0.950 ml. of S-collidine in 25 ml. toluene at 5° C., a solution of 0.6 ml. of ethyl chloroformate in the same solvent. Continue stirring of the reaction mixture at room temperature for another 20 hours. Add ether to the mixture, filter off solid material and wash well with water. Recrystallize the solid material from hot methanol with charcoal treatment to afford the product, 1-(p-chlorophenyl)-1,2,3,4,5,6-hexahydro-2,5-benzodiazocine-5-carboxylic acid, ethyl ester hydrochloride, M.P. 281.5–282° C.

Analysis.—Calcd. for: $C_{19}H_{21}N_2O_2Cl \cdot HCl$ (percent): C, 59.85; H, 5.82; N, 7.35; Cl, 18.60. Found (percent): C, 59.69; H, 5.84; N, 7.37; Cl, 18.73.

In the same way as described in the example, one may start with the following benzodiazocines, prepared in accordance with the aforesaid Belgian patent, and produce the desired final products having the same utility. Start with:

1,2,3,4,5,6-hexahydro-1-phenyl-2,5-benzodiazocine;
1,2,3,4,5,6-hexahydro-1-(m-trifluoromethylphenyl)-2,5-benzodiazocine;
1-(p-fluorophenyl)-1,2,3,4,5,6-hexahydro-2,5-benzodiazocine;
1,2,3,4,5,6-hexahydro-1-(p-methoxyphenyl)-2,5-benzodiazocine to prepare the following products, respectively:

1,2,3,4,5,6-hexahydro-1-phenyl-2,5-benzodiazocine-5-carboxylic acid, ethyl ester hydrochlorine;
1,2,3,4,5,6-hexahydro - 1 - (m-trifluoromethylphenyl)-2,5-benzodiazocine - 5 - carboxylic acid, ethyl ester hydrochloride;
1-(p-fluorophenyl) - 1,2,3,4,5,6 - hexahydro-2,5-benzodiazocine - 5 - carboxylic acid, ethyl ester hydrochloride;
1,2,3,4,5,6-hexahydro - 1 - (p-methoxyphenyl)-2,5-benzodiazocine - 5 - carboxylic acid, ethyl ester hydrochloride.

The invention claimed is:

1. A compound having the formula:

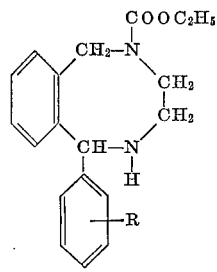

in which R stands for hydrogen, halogen, halo(lower) alkyl or lower alkoxy; and its pharmacologically acceptable acid-addition salts.

2. A compound of claim 1 having the formula:

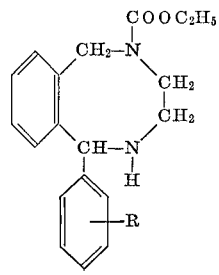

in which R represents hydrogen, chlorine, trifluoromethyl or methoxy.

3. As a compound of claim 1; 1-(p-chlorophenyl)-1,2,3,4,5,6-hexahydro - 2,5 - benzodiazocine-5-carboxylic acid, ethyl ester hydrochloride.

References Cited
FOREIGN PATENTS
646,221   4/1964   Belgium _____ 260—239

OTHER REFERENCES
Kim et al.: J. Org. Chem. vol. 32, pp. 3720–3733 (1967).

ALTON D. ROLLINS, Primary Examiner

U.S. Cl. X.R.
424—244

PO-1050
(5/69)

UNITED STATES PATENT OFFICE
CERTIFICATE OF CORRECTION

Patent No. 3,565,888          Dated Feb. 23, 1971

Inventor(s) Cesario O. Tio

It is certified that error appears in the above-identified patent and that said Letters Patent are hereby corrected as shown below:

In the above-identified patent, Column 1, line 5, the situs is incorrect. Kindly change this line from
    --corporation of New York--
to read --corporation of Delaware--

Signed and sealed this 2nd day of November 1971.

(SEAL)
Attest:

EDWARD M. FLETCHER, JR.      ROBERT GOTTSCHALK
Attesting Officer              Acting Commissioner of Pate